(12) United States Patent
Weisenberg

(10) Patent No.: US 10,774,972 B2
(45) Date of Patent: Sep. 15, 2020

(54) PIPE LINING APPARATUS MATERIAL CASTING ASSEMBLY

(71) Applicant: Sipp Technologies, LLC, Wichita, KS (US)

(72) Inventor: Kent Weisenberg, Fruit Cove, FL (US)

(73) Assignee: SIPP TECHNOLOGIES, LLC, Wichita, KS (US)

( * ) Notice: Subject to any disclaimer, the term of this patent is extended or adjusted under 35 U.S.C. 154(b) by 0 days.

(21) Appl. No.: 16/254,248

(22) Filed: Jan. 22, 2019

(65) Prior Publication Data

US 2019/0226621 A1 Jul. 25, 2019

Related U.S. Application Data

(60) Provisional application No. 62/635,794, filed on Feb. 27, 2018, provisional application No. 62/620,171, filed on Jan. 22, 2018.

(51) Int. Cl.

| F16L 55/1645 | (2006.01) |
|---|---|
| F16L 55/18 | (2006.01) |
| B05B 13/06 | (2006.01) |
| F16L 55/32 | (2006.01) |
| F16L 55/164 | (2006.01) |
| F16L 101/16 | (2006.01) |

(52) U.S. Cl.
CPC ...... *F16L 55/1645* (2013.01); *B05B 13/0636* (2013.01); *F16L 55/164* (2013.01); *F16L 55/18* (2013.01); *F16L 55/32* (2013.01); *F16L 2101/16* (2013.01)

(58) Field of Classification Search
USPC .............. 118/306, 317, 323, 407, 408, 321; 425/11, 427, 460; 405/184.1, 150.1, 268
See application file for complete search history.

(56) References Cited

U.S. PATENT DOCUMENTS

| 3,401,442 A | 9/1968 | Matheny |
| 4,414,918 A | 11/1983 | Nelson Holland |
| 5,309,947 A | 5/1994 | Hinger |
| 6,699,324 B1 * | 3/2004 | Berdin ............... B05B 13/0636 118/306 |
| 7,992,514 B1 * | 8/2011 | Weisenberg ........... B05B 1/005 118/317 |
| 2002/0102136 A1 * | 8/2002 | Holland ................. B08B 9/049 405/184.1 |

(Continued)

FOREIGN PATENT DOCUMENTS

| KR | 20090085345 A | 8/2009 |
| KR | 20120066761 A | 6/2012 |

OTHER PUBLICATIONS

Young, PCT International Search Report and Written Opinion, PCT/US19/14589, Int'l filing date Jan. 22, 2019, dated Mar. 29, 2019.

*Primary Examiner* — Yewebdar T Tadesse

(74) *Attorney, Agent, or Firm* — Thomas C. Saitta

(57) ABSTRACT

A material casting assembly for a pipe lining apparatus, the assembly having a housing mounted onto an extension/retraction arm and containing an impingement block controlled by an impingement valve, and a static auger bounded by a rotating cylinder which defines a mixing path to an extrusion chamber. The rotating cylinder has exit ports through which lining material is expelled from the extrusion chamber onto a pipe wall.

3 Claims, 2 Drawing Sheets

(56) References Cited

U.S. PATENT DOCUMENTS

| | | |
|---|---|---|
| 2004/0194697 A1 | 10/2004 | Davis |
| 2011/0097486 A1 | 4/2011 | Weisenberg |
| 2013/0108787 A1* | 5/2013 | Lages ................ B05B 13/0636 427/236 |
| 2014/0020499 A1 | 1/2014 | Weisenberg |
| 2018/0328527 A1 | 11/2018 | Weisenberg |

* cited by examiner

PIPE LINING APPARATUS MATERIAL CASTING ASSEMBLY

BACKGROUND OF THE INVENTION

This invention relates generally to internal pipe lining rehabilitation apparatuses or systems, and more specifically relates to pipe lining apparatuses that are adapted and adaptable for use in the structural repair or remediation of degraded, damaged or leaking pipes, or such pipe lining apparatuses adapted and adaptable to improve or upgrade qualities and characteristics of pipes prior to or after use or installation. More specifically, this invention relates to lining apparatuses that spray or cast a lining onto the internal pipe surface for rehabilitation or remediation of an existing host pipe, and even more specifically to a novel and improved material casting assembly.

Lining devices for pipe rehabilitation that spray or cast a liner onto the internal surface of a pipe in need of repair whereupon the liner cures to form a "pipe-within-a-pipe" are typically referred to by the acronym SIPP, which stands for Spray-In-Place-Pipe. Pipe rehabilitation rather than pipe replacement is practiced heavily in industrial and municipal water markets due to two primary advantages. Firstly, the cost of pipe rehabilitation is significantly cheaper than pipe replacement. Secondly, pipe rehabilitation is far less of an invasive practice than replacement. For instance, replacing a pipeline running under a major road or building results in a major disruption to a community and in some cases, is not a feasible solution. Thus, pipe rehabilitation methods are a highly valued solution and far more desirable in many situations.

The common SIPP devices utilize an accumulator reel to retract an umbilical or tether tensile member (the term "umbilical" being used hereafter to refer collectively to an umbilical, tether, tension member or similar tensile structure or combination of such members, and containing or further comprising material, electrical and communication transmission members) which is attached to the spraying or casting apparatus as it sprays the liner onto the inner pipe wall. The pipe lining apparatuses may be pulled through the pipe by the umbilical or may be self-powered.

The spraying or casting function is performed by a material casting assembly that dispenses, propels or otherwise distributes uncured liner material, such as for example a polymer resin, onto the inner surface of the pipe as the material casting assembly is orbited or rotated within the pipe. The liner material then cures in place to form a structural liner or lining—i.e., a new internal layer or pipe within the original pipe. The umbilical member contains conduits that convey the liner material from a pumping source to the casting assembly through the operational components of the pipe lining apparatus.

It is an object of this invention to provide an improved material casting assembly for use on pipe lining apparatuses.

SUMMARY OF THE INVENTION

The invention is in general a material casting assembly for pipe lining apparatuses adapted to cast curable lining material onto the interior of a pipe for rehabilitation or repair, the pipe lining apparatuses comprising a transport assembly enabling the pipe lining apparatus to move through a pipe interior, either under self-power or pulled by a tether. The pipe lining apparatus further comprises operational components of known type to receive lining material from an umbilical member delivery system and deliver the material into one or more material casting assemblies which orbit about or with the operational components to evenly disperse the lining material onto the interior of the pipe as the pipe lining apparatus moves through the pipe.

The material casting assemblies each comprise an extension/retraction arm that allows for retraction, extension and translation of the material casting housings as necessary for proper positioning relative to the pipe wall. The housing of the material casting assembly receives the lining material in an impingement block under control of an impingement block valve operated by an impingement motor. The material is combined in the impingement block and then passes through a static auger that defines a fluid path for further mixing the material. The static auger is bounded by the non-apertured portion of an externally-mounted rotating cylinder. The mixed material exits the path of the static auger into an outwardly-facing extrusion chamber. The rotating cylinder further comprises an apertured portion defining exit ports in communication with the extrusion chamber through which the material is accelerated outwardly onto the pipe wall or an earlier-applied layer.

In alternative format, the invention sis described as a material casting assembly for a pipe lining apparatus, the assembly comprising a housing mounted onto an extension/retraction arm; said housing retaining an impingement block receiving lining material, a static auger, a rotating cylinder, a cylinder motor and an extrusion chamber; said impingement block delivering the lining material into a path created by the combination of said static auger and said rotating cylinder, wherein the rotation of said rotating cylinder relative to said static auger mixes and propels the lining material into said extrusion chamber; said rotating cylinder having a non-apertured portion bounding said static auger and an apertured portion creating exit ports in communication with said extrusion chamber, such that the lining material is expelled through said exit ports. And furthermore, such assembly further comprising an impingement block valve controlling passage of the lining material into said impingement block; and/or wherein said impingement block valve purges said impingement block upon cessation of the casting operation.

DETAILED DESCRIPTION OF THE INVENTION

Figure 1:
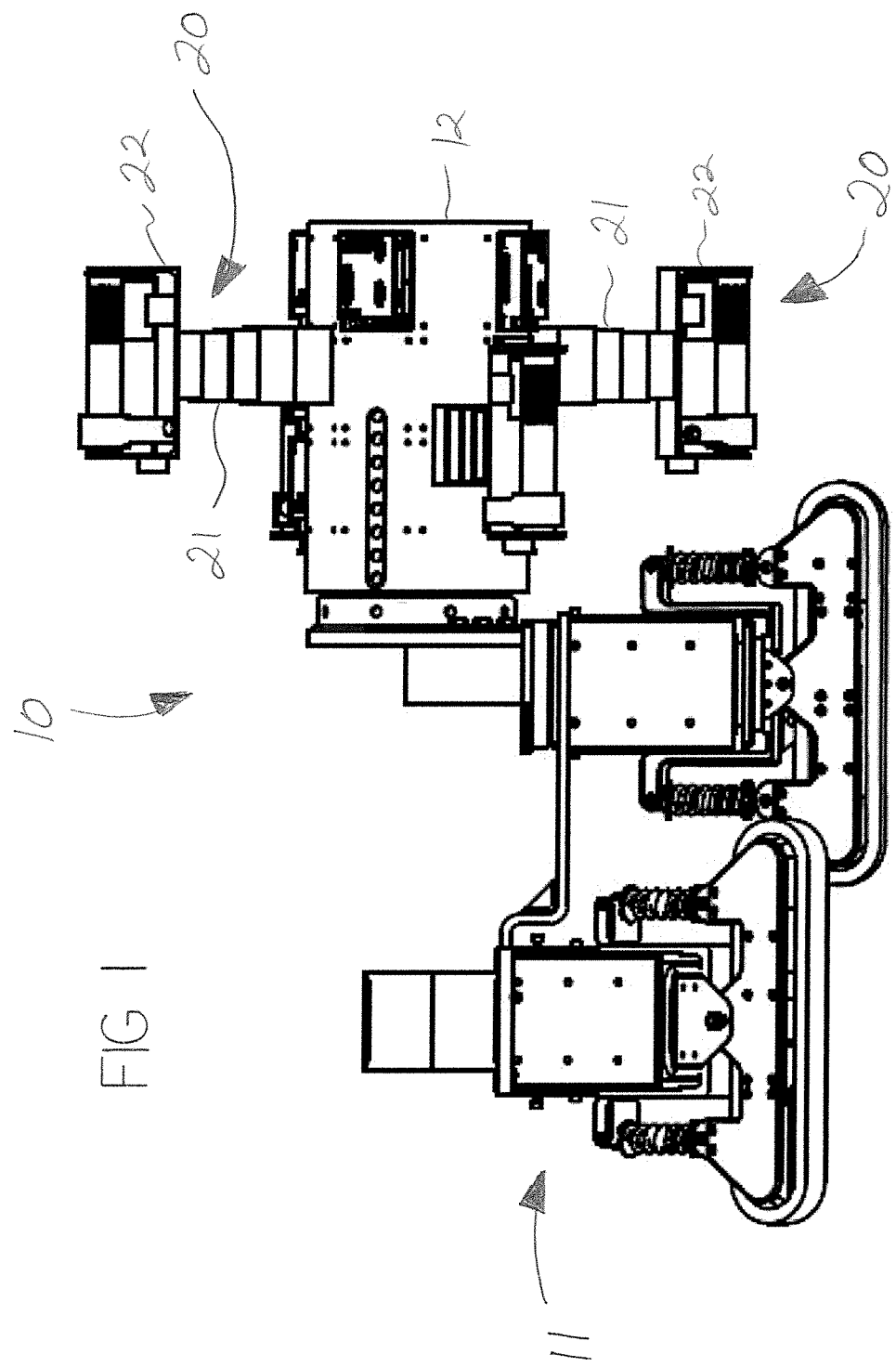
FIG. 1 is a view of a representative embodiment of a pipe lining apparatus having multiple material casting assemblies.
Figure 2:
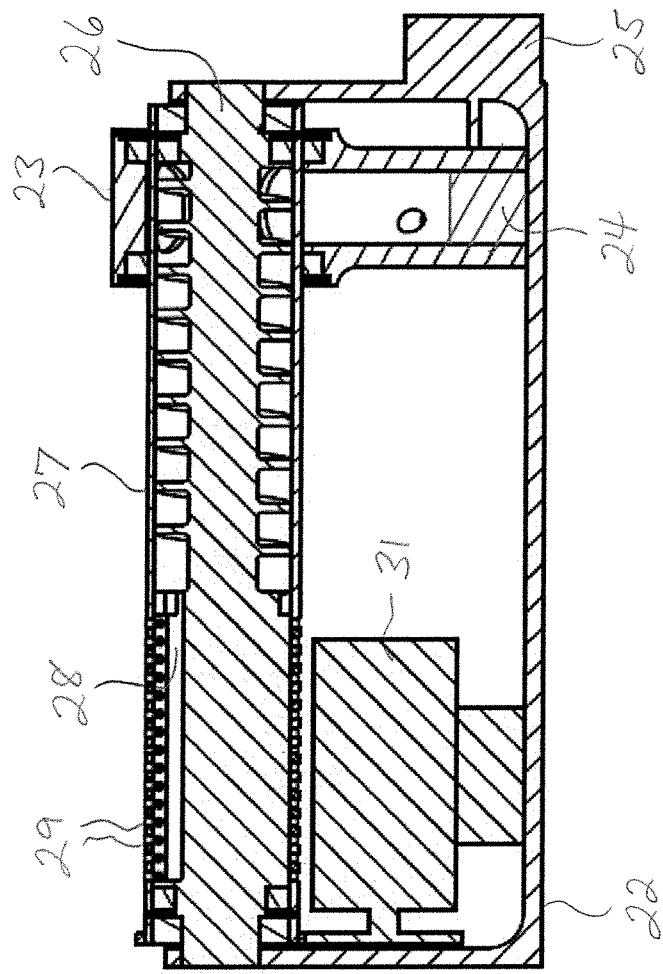
FIG. 2 is a cross-sectional view of the housing of the material casting assembly, taken along line 2-2 of FIG. 3.
Figure 3:
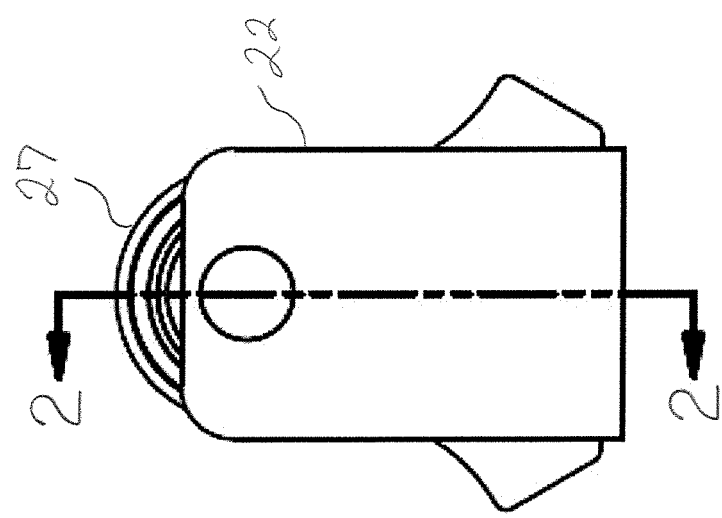
FIG. 3 is an end view of the material casting assembly of FIG. 2.

With reference to the drawings, which are provided for descriptive, disclosure, enablement and illustrative purposes, it being intended that the drawings be non-limiting as to the scope and definition of the invention, the invention is shown as comprising in general a material casting assembly 20 for a pipe lining apparatus 10, the pipe lining apparatus 10 comprising a transport assembly 11 enabling the pipe lining apparatus 10 to move through a pipe interior, either under self-power or by being pulled by an umbilical tether. The transport assembly 11 is provided with wheels, rollers, belts, tracks or the like to facilitate movement or the pipe lining apparatus 10. The pipe lining apparatus 10 further comprises operational components 12 of known type to receive lining material from an umbilical member delivery system and deliver the material into one or more material casting assemblies 20 which orbit about or in conjunction with the operational components 12 to evenly disperse the lining material onto the interior of a pipe being rehabilitated or repaired as the pipe lining apparatus 10 moves through the pipe. The lining material may be delivered into the material casting assembly 20 as separate components which are combined and mixed within the material casting assembly 20.

The material casting assemblies 20 each comprise an actuated extension/retraction arm 21, which in the embodiment shown comprises a telescoping column that allows for controlled retraction, extension and translation of the material casting housings 22 by a motor or similar means as necessary for proper positioning the material casting housings 22 relative to the pipe wall. The housings 22 are preferably mounted in a pivoting manner to the extension/retraction arms 21 for increased spray coverage.

The housing 22 of the material casting assembly 20 receives the lining material into an impingement block or chamber 23, the passage of lining material into the impingement block 23 being controlled by an impingement block valve 24 which is operated by an impingement motor 24. The material is combined and initially mixing is initiated within the impingement block 23, with the impingement occurring along a vector that induces spiral flow to promote mixing. The material then passes through a static auger 26 that provides a spiral fluid path for further mixing the material, the static auger 26 being bounded by the non-apertured portion of an externally-mounted rotating cylinder or sleeve 27. The cylinder 27 is rotated by a cylinder motor 31. The mixed material exits the path of the static auger 26 into an outwardly-facing extrusion chamber 28, which narrows the path of the material to allow vectored, i.e., non-360-degree, radial casting along a predetermined azimuth. The rotating cylinder 27 mixes and moves the material into the extrusion chamber 28 due to the differential velocity between the static auger 26 and the rotating cylinder 27. The portion of the externally-mounted rotating cylinder 27 corresponding to the extrusion chamber 28 comprises an apertured portion defining exit ports 29 in communication with the extrusion chamber 28 and through which the material is accelerated outwardly onto the pipe wall or an earlier-applied layer.

The impingement block valve 24 further acts to purge the impingement block 23 while closing to ensure that all material is removed from the impingement block when the casting operation is ceased.

It is contemplated that equivalents and substitutions for certain elements set forth above may be obvious to those of ordinary skill in the art, and therefore the true scope and definition of the invention is to be as set forth in the following claims.

I claim:

1. A material casting assembly for a pipe lining apparatus, the material casting assembly comprising:
    a housing mounted onto an extension/retraction arm;
    said housing retaining an impingement block receiving lining material, a static auger, a rotating cylinder, a cylinder motor and an extrusion chamber;
    said impingement block delivering the lining material into a path created by the combination of said static auger and said rotating cylinder, herein the rotation of said rotating cylinder relative to said static auger mixes and propels the lining material into said extrusion chamber;
    said rotating cylinder having a non-apertured portion bounding said static auger and an apertured portion creating exit ports in communication with said extrusion chamber, such that the lining material is expelled through said exit ports.

2. The material casting assembly of claim 1, further comprising an impingement block valve controlling passage of the lining material into said impingement block.

3. The material casting assembly of claim 2, wherein said impingement block valve purges said impingement block upon cessation of the casting operation.

\* \* \* \* \*